May 30, 1939.  L. K. JACKSON  2,160,215
TRANSMISSION
Filed June 6, 1936
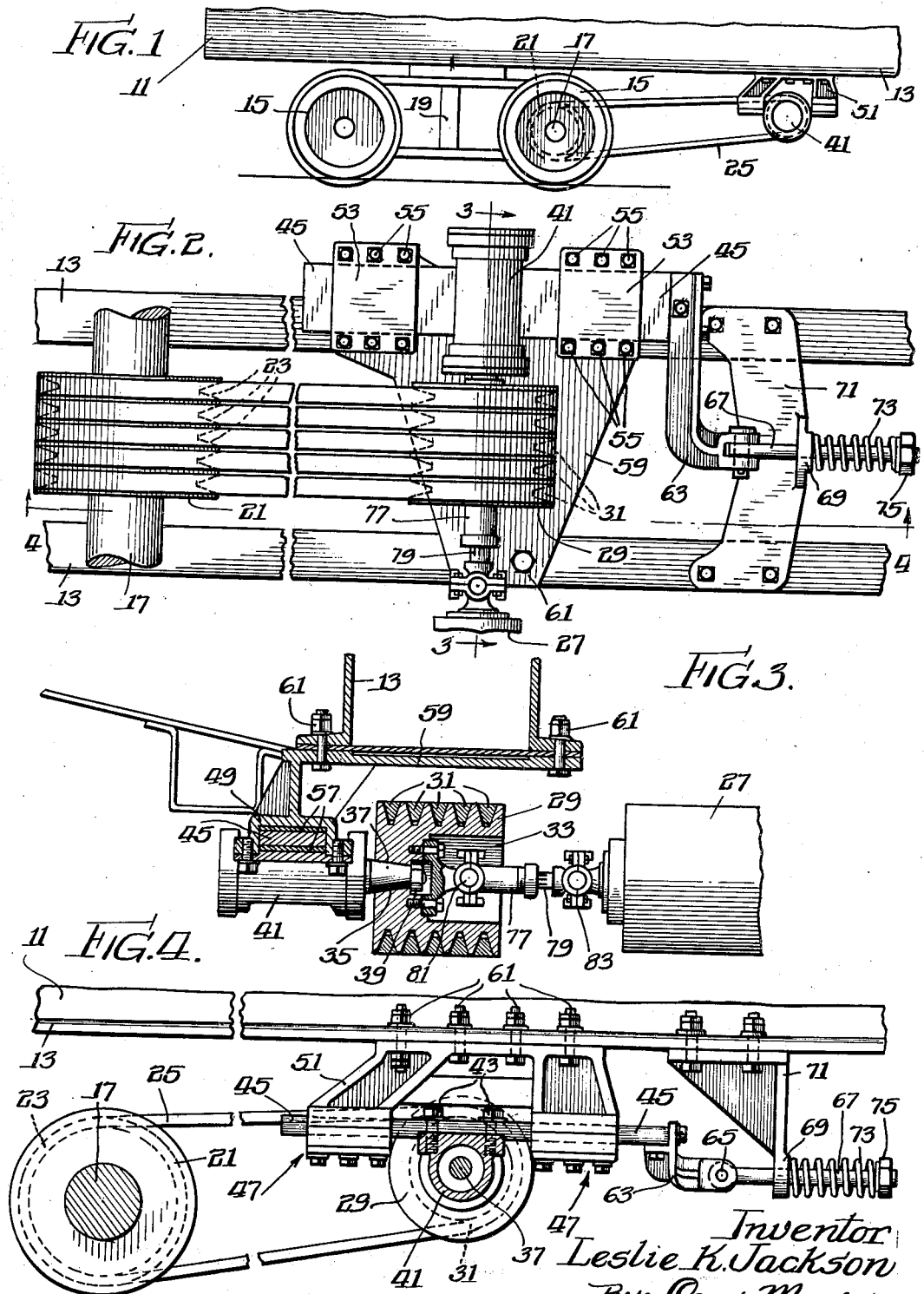
Inventor
Leslie K. Jackson
By:- Cox & Moore
attys Patented May 30, 1939

2,160,215

UNITED STATES PATENT OFFICE 2,160,215

TRANSMISSION

Leslie K. Jackson, Chicago, Ill., assignor to North American Car Corporation, Chicago, Ill., a corporation of Illinois Application June 6, 1936, Serial No. 83,831

5 Claims. (Cl. 105—107)

My invention relates in general to drives of a mechanical nature and has more particular reference to the driving of shafts by means of flexible power transmission elements such as belts, chains and the like, the invention relating especially to a simplified arrangement for maintaining a uniform driving tension on the flexible element, regardless of direction of drive.

There are many applications in which it is necessary or desirable to employ flexible driving means to interconnect rotatable power transmission elements such as a driving and a driven pulley, and where it is necessary to mount one or both of the rotatable elements for bodily shifting movement. For example, in axle-driven transmissions for railway cars, wherein the driving pulley is on the axle of the car while the driven pulley is on the frame of the car, the pulleys being drivingly connected by flexible transmission means such as a belt or belts traveling on said pulleys, it is desirable to mount at least the driven pulley for shifting movement on the frame of the car in order to relieve excess tension in the flexible driving means initiated by the turning of the axle and of the driving pulley thereon, when the car or vehicle travels a curved track, and to maintain a uniform predetermined driving tension in the flexible means at all times and to compensate for wear and stretching of the same during service. It has been proposed to accomplish the foregoing by mounting one of the pulleys, usually the driven pulley, in a frame rockable on the car and normally urged, as by a spring, in a direction to maintain the flexible driving means under a desired tension. Where a tiltable frame is employed, however, it is impossible, without adjusting the spring, to operate the transmission at a desired driving tension in the tight or driving side of the flexible transmission means regardless of the direction of driving movement. If the spring is adjusted to maintain a desired tight side or driving tension for driving in one direction, it will be found that, upon reversing the direction of drive, driving tension will be either so low as to cause slippage and loss of power, if not complete disengagement of the flexible means from the pulleys, or else so high as to cause danger of breakage of the flexible means.

The foregoing results from the inherent nature of a tilting pulley support frame, since the flexible driving means has a tight or driving side and a slack side which in effect exert unequal tension on the pulley frame at different distances from the tilting axis of the frame. When the direction of drive is reversed, of course, the forces, applied to the pulley and through the pulley to the tilting frame respectively by the tight and slack stretches of the flexible driving means, are transposed so that resultant turning moment applied by the driving means, when operating in one direction with the tight side further than the slack side from the tilting axis of the support frame is considerably greater than turning moment exerted on the pulley frame when the direction of drive is reversed and the tight side of the driving means is between the tilting axis of the frame and the slack side. To maintain uniform tight side tension in the flexible driving means regardless of direction of drive, where a tilting pulley support is utilized, requires an adjustment of the counterpoise spring each time the direction of drive is reversed.

It is of course impractical for reasons of economy, among others, to adjust the spring whenever the driving direction is reversed and consequently it is necessary, if the arrangement is used at all in a reversing drive, to set the spring to furnish tension on the flexible means intermediate that required to provide substantially the same driving tension in the flexible means during drive in either direction.

I now propose to solve the above stated problem by eliminating the effect of unequal turning moments applied on the pulley and its support frame as a result of the unequal tension by the tight and slack sides of the flexible driving means.

An important object of the invention resides in providing an improved mounting for a rotatable element, such as a pulley, driven by a flexible power transmission element, such as a belt, whereby the pulley may be maintained at all times with its axle yieldingly in position such that the flexible driving element is under a predetermined tension in its tight or driving side regardless of the direction of driving motion.

Another important object is to provide a bracket mounting for a rotatable drive element, said bracket being mounted for movement about an axis substantially at infinity and preferably comprising a slide, whereby a flexible power transmitting element operating in conjunction with the rotatable element may be maintained under yielding tension such that the tight or driving side of the flexible element is maintained substantially under the same tension regardless of the direction of driving motion.

Another important object is to provide improved mechanical drive means for powering devices such as generators, compressors and the like, from an axle of a vehicle, said drive embodying flexible driving means traveling on a wheel or pulley yieldingly mounted for guided movement so that its axis is at all times maintained in a flat plane.

Another important object is to provide simplified and effective means for driving devices such as generators, compressors and the like, which are usually rigidly supported on a vehicle body, from a rotating axle of the vehicle; a further object being to provide an improved driving connection embodying a pulley on the vehicle axle and a pulley shiftable on the frame of the vehicle about an axis substantially at infinity and yieldingly urged in one direction so as to maintain tension upon the flexible driving element interconnecting the pulleys.

Another important object is to slidably mount a driven pulley as in a bracket and to provide resilient means operating to urge the pulley in a direction substantially at right angles with respect to its rotating axis, whereby to maintain a flexible power transmission element drivingly associated with said pulley, under yielding tension, including means whereby the resilient urge is applied on a line passing through the axis of the pulley and substantially in line with the resultant forces exerted on the pulley by the flexible driving means.

Another important object resides in providing a pulley adapted for connection on a pulley mounting shaft extending outwardly at one end of the pulley in position to be journaled in a bearing having slidable mounting in a main support frame, and a flexible connection preferably comprising universal joints and a splined extensible drive shaft extending outwardly of the opposite end of the pulley in position for connection with a device such as a compressor or generator to be driven.

The foregoing and numerous other important objects, advantages and inherent functions of the invention will become apparent as the same is more fully understood from the following description, which taken in connection with the accompanying drawing, discloses a preferred embodiment of the invention.

Referring to the drawing:

Figure 1 is a fragmentary side view of a portion of a vehicle, namely a railway car, provided with a mechanical drive embodying my present invention;

Figure 2 is a bottom view of the driving mechanism shown in Figure 1; and

Figures 3 and 4, respectively, are sectional views taken substantially along the lines 3—3 and 4—4 in Figure 2.

To illustrate my invention, I have shown on the drawing a vehicle, namely a railroad car 11, having any usual or preferred construction including bottom frame elements or sills 13, and wheels 15 including axles or shafts 17 which rotate with the wheels. The wheels and axles, as is usual in railway cars, may be carried on trucks 19 pivotally mounted with respect to the frame of the car in order to permit the wheels to turn with respect to the frame of the car in following a curved track.

While I have shown the driving mechanism of my present invention as applied in a railway car, it should be understood that the invention is not necessarily limited to use on railway cars but may be used to advantage wherever a rotatable driven element is powered from a rotatable driving element by flexible power transmitting means such as a chain or a belt, or similar flexible means. The present invention, however, is particularly well suited for application in railway cars for the purpose of driving devices such as generators, compressors and the like, usually supported on or under the body of the car. To this end, a drive pulley 21 of any suitable or preferred construction may be mounted on an axle 17. In the illustrated embodiment, the drive pulley 21 is formed with a plurality of grooves 23, each adapted to receive a belt 25. The generator, compressor or other device to be driven, may be mounted in any suitable or preferred position on the body 11, the device to be driven being preferably secured in suitable brackets extending beneath and fastened to the frame elements 13 in position substantially in line with the axis of a driven pulley 29. The pulley 29 may also be of any preferred construction and may be formed with peripheral grooves 31 for receiving the flexible power transmission elements 25, the pulley 29 being arranged with its grooves 31 extending substantially in line with the corresponding grooves 23 of the drive pulley 21.

The pulley 29 may be and preferably is provided with a cavity 33 in the end thereof which faces toward the device 27, and the other end of the pulley is preferably formed with a tapering socket 35 extending axially in the pulley and opening at its restricted end in the cavity 33. This socket 35 is adapted to receive the tapered end of a shaft or axle 37, the pulley being held on the axle by means of a nut or other holding element 39 applied on the end of the axle which extends within the cavity 33. The axle 37 extends to and is journaled in a bearing 41 forming a shaft housing, and this housing in turn is secured in any preferred manner, as for example by means of the studs 43, on a slide bar 45. The housing 41 is preferably mounted on the bar intermediate the ends thereof and the bar is slidingly received, on opposite sides of the housing 41, in slide bearings 47. These bearings 47 may comprise grooved portions 49 forming preferably integral parts of a support bracket 51, the slide bar extending in said grooved portions and being retained therein by cover plates 53 secured on the grooved portions by fastening studs 55 or other suitable securing means. If desired, anti-friction means 57, comprising plates of bearing metal, may be interposed in the slide bearings 47 between the opposing faces of the slide bar and the portions of the slide bearings 47 which receive the same.

The bracket 51 has a mounting portion 59 by means of which it may be secured, preferably rigidly, upon the sill 13 of the vehicle in any suitable fashion, as by means of the fastening bolts 61. The bracket 51 is mounted in position such that the pulley 29 is positioned with its grooves 31 substantially in alignment with the corresponding grooves 23 of the drive pulley 21 and with the axis of the pulley 29 substantially in line with the device 27 which is to be driven in response to the rotation of the shaft 17, and I provide means for connecting the pulley drivingly with the shaft of the device 27.

Among the difficulties encountered in mechanical drives embodying flexible driving elements, particularly where the same are applied in driving a pulley mounted on the frame of a railway car from a rotating axle of the car, is the necessity of maintaining the flexible element under substantially uniform tension despite the variation in the vertical distance between the drive pulley and the driven pulley when the vehicle is traveling a curved path. The drive pulley, being mounted on the axle, moves laterally with respect to the car frame on which the driven pulley is mounted when the truck 19 pivots on the frame of the car in order to follow a curved track.

Flexible driving elements, such as belts, should be maintained under a predetermined tension, within limits, for maximum driving efficiency, and these limits may be exceeded during the movement of the car axle in following a curved track as well as by stretching or wear of the belt in service.

My present invention, however, permits the driven pulley to shift toward and away from the drive pulley in order to accommodate the movements of the latter with the truck. However, the slide bar 45 is connected with yielding means operating to urge the bar and the pulley carried thereon in a direction such that the driving elements 25 are always maintained under sufficient tension to prevent them from leaving the grooves of the pulley, and to maintain driving efficiency regardless of elongation of the driving elements in service. To this end, the bar 45 carries a bracket 63 to which is pivoted, as at 65, a tension rod 67 which extends through an opening 69 in a bracket 71 which may be secured on the sill 13 substantially in line with the pulleys 21 and 29. A spring 73 encircles the end of the rod 67 and is connected therewith, as at 75, at one end of the spring, the other end of the spring extending to and bearing on the bracket 71, thereby normally and yieldingly urging the rod in a direction to draw the slide 45 and the driven pulley in a direction to maintain the flexible driving elements 25 under a desired tension. The connection between the spring 73 and the rod 67 is preferably adjustable in order to adjust the tension under which the flexible driving elements are maintained, and it will be seen that the resilient tension applied on the bar 45 and the driven pulley is exerted substantially along a line passing through the rotating axis of the driven pulley in a direction opposite to the resultant force applied on the driven pulley by the flexible driving elements.

It will be seen that the driven pulley may move longitudinally of the vehicle frame in order to compensate for movements of the vehicle axle while in transit and to maintain the flexible driving elements 25 under substantially uniform tension.

Of course, when the car is following a curved track, all of the belts 25 are not under the same tension, the belts on one side being slack, but the yielding of the pulley 29 will protect the belts on the other side from excessive tension. The device of the present invention, however, also is adapted to maintain the belts under substantially the same driving tension on the tight side regardless of the direction of drive. The tension in the tight side of the belts, which is the upper stretch, when the vehicle travels toward the left in Figure 2, is substantially the same as in the tight side, which is the lower stretch, when the vehicle is moving in the opposite direction. Since, by virtue of the fact that the slide 45 is mounted for sliding movement in the slide bearings 47, the pulley support frame 41 is mounted for bodily movement on the frame 11, with the axis of the pulley maintained at all times in a flat plane it will be seen that the forces exerted by the tight and slack sides of the flexible driving means 25 are the same in direction and magnitude upon said frame regardless of the direction of the movement of the driving means. Consequently the yielding means 67 may be adjusted accurately to provide the same tight side tension in the driving means 25 regardless of its direction of movement. The pulley frame is thus, in effect, mounted for movement on the frame 11 about an axis located at infinity. This characteristic permits belt tension to be accurately adjusted by means of the nut 75 for movement of the car in either direction and the spring 73 of course has sufficient expansibility to maintain the belts at a tension within efficient operating limits as the belts lengthen permanently in service.

Any suitable or preferred means may be utilized for drivingly connecting the pulley with the device 27. Since the device 27, however, is usually rigidly mounted on the frame of the vehicle, it is ordinarily necessary to provide a flexible coupling between the pulley 29 and the device 27 in order to compensate for the movement of the pulley, and I prefer to utilize a splined coupling comprising a sleeve 77 and a shaft 79 extending within and non-rotatably though axially slidable within the sleeve. The sleeve 77 is secured to the pulley 29 by means of a universal coupling 81, which is fastened to the pulley preferably within the cavity 33, the coupling preferably extending entirely within the cavity and being housed within the pulley. The splined shaft 79 is also preferably connected through a universal coupling 83 with the device 27.

It is thought that the invention and numerous of its attendant advantages will be understood from the foregoing description, and it is obvious that numerous changes may be made in the form, construction and arrangements of the several parts without departing from the spirit or scope of the invention or sacrificing its attendant advantages, the form hereinbefore described being a preferred embodiment for the purpose of demonstrating the invention.

Having thus described my invention, what I claim is new and desire to secure by Letters Patent is:

1. The combination with a car having a main frame and a truck mounted axle, of a power operated device rigidly mounted on the frame of said car, and means to drive said device from said truck mounted axle comprising a driving pulley on said axle, a driven pulley shiftably mounted on the frame for movement toward and away from the truck mounted axle with its axis substantially in alignment with the device to be driven, means to guide the movement of the driven pulley so that its axis is at all times maintained in the same plane, flexible power transmission means drivingly connecting said pulleys, yielding means normally urging the mounted pulley in a direction on said frame to maintain the flexible driving means under tension, said yielding means applying its force in a direction in line with the resultant forces applied on the driven pulley by said flexible driving means, and means for coupling said slidably mounted pulley with the device to be driven.

2. The combination with a car having a main frame and a truck mounted axle, of a power operated device mounted on the frame of said car, and means to drive said device from said truck mounted axle comprising a driving pulley on said axle, a driven pulley shiftably mounted on the frame with its axis substantially in alignment with the device to be driven, flexible power transmission means drivingly connecting said pulleys, means to guide the movement of the driven pulley bodily toward and away from the driving pulley so that the axis of the driven pulley is at all times maintained in the same plane, and yielding means normally urging the mounted pulley in a direction on said frame to maintain the flexible driving means under tension, said yielding means applying its force through the axis of rotation of the driven pulley and substantially in line with the resultant forces applied on the driven pulley by said flexible driving means.

3. In a railway carriage having a frame and a truck pivoted thereto, an axle on said truck offset radially from the pivot, a pulley on said axle, a shaft slidably mounted on said frame for movement toward and away from said axle, a shaft pulley on said shaft, V-drive belts connecting said pulleys, spring means operatively connected with said shaft to maintain the belts under predetermined tension, said spring means being arranged to apply its force in a direction substantially in line with the resultant forces applied on the shaft pulley by the belts whereby the tension in the tight stretch of the drive belts is substantially the same regardless of the direction of rotation of said pulley on said axle, and a driven mechanism connected to said shaft.

4. The combination with a car having a main frame and a truck mounted axle, of a power operated device mounted on the frame of said car, and means to drive said device from said truck mounted axle comprising a driving pulley on said axle, a driven pulley shiftably mounted on the frame with its axis substantially in alignment with the device to be driven, flexible power transmission means drivingly connecting said pulleys, means to guide the movement of the driven pulley bodily toward and away from the driving pulley so that the axis of the driven pulley is at all times maintained in the same plane, and yielding means normally urging the mounted pulley in a direction on said frame to maintain the flexible driving means under tension, said yielding means applying its force through the axis of rotation of the driven pulley and substantially in line with the resultant forces applied on the driven pulley by said flexible driving means, and means drivingly connecting said driven pulley with said power operated device comprising a coupling embodying a spline and universal coupling means.

5. The combination with a car having a main frame and a truck mounted axle, of a power operated device mounted on the frame of said car, and means to drive said device from said truck mounted axle comprising a driving pulley on said axle, a driven pulley shiftably mounted on the frame with its axis substantially in alignment with the device to be driven, flexible power transmission means drivingly connecting said pulleys, means to guide the movement of the driven pulley bodily toward and away from the driving pulley so that the axis of the driven pulley is at all times maintained in the same plane, yielding means normally urging the mounted pulley in a direction on said frame to maintain the flexible driving means under tension, said yielding means applying its force through the axis of rotation of the driven pulley and substantially in line with the resultant forces applied on the driven pulley by said flexible driving means, said driven pulley having a cavity in its end facing said power operated device, and means drivingly connecting the power operated device with said driven pulley and comprising a universal coupling and extending in said cavity and therein attached on said driven pulley.

LESLIE K. JACKSON.